United States Patent Office 3,770,719
Patented Nov. 6, 1973

3,770,719
2-AMINO-4-(AZOYL)-AZO-THIAZOLE COMPOUNDS AND QUATERNARY DERIVATIVE THEREOF
John G. Fisher and Clarence A. Coates, Jr., Kingsport, Tenn., assignors to Eastman Kodak Company, Rochester, N.Y.
No Drawing. Filed Dec. 7, 1967, Ser. No. 688,687
Int. Cl. C09b 29/36; D06p 3/52
U.S. Cl. 260—158                                    14 Claims

ABSTRACT OF THE DISCLOSURE

Monoazo compounds containing a quaternized or unquaternized benzothiazolyl, thiazolyl, pyrazolyl, thiadiazolyl or triazolyl diazo component and a 2-amino-4-thiazolyl coupling component. The quaternary azo compounds are useful for dyeing acrylic, modacrylic and acid-modified polyester textile materials orange to blue shades and exhibit excellent fastness properties such as fastness to light and wet processing.

This invention relates to certain novel monoazo compounds, to certain novel cationic monoazo compounds, and to acylic, modacrylic, and acid-modified polyester textile materials dyed with the novel azo compounds.

The novel monoazo compounds of the invention have the formula (I)

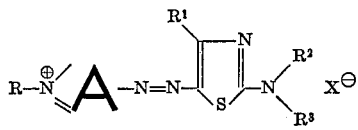

wherein

A represents the remainder of a 5 or 6 membered heterocyclic aromatic ring system attached to the azo group through a ring carbon atom in which ring system the quaternary nitrogen adjacent to A is a ring member linked to the azo group through a continuous chain of conjugation, the ring atoms of A consisting of carbon or carbon and at least one oxygen, sulfur or nitrogen atom;
R represents lower alkyl or benzyl;
$R^1$ represents hydrogen, lower alkyl or a phenyl radical;
$R^2$ and $R^3$, when each are taken singly, are the same or different and each represents hydrogen, a lower alkyl radical, cyclohexyl, or a phenyl radical;

when taken collectively, represent a piperidino radical, a morpholino radical, or an —N-thio-morpholine-1,1-dioxide radical; and
X is an anion.

The novel monoazo compounds of the invention give orange to blue dyeings on acrylic, modacrylic and acid-modified polyester textile material. The dyeings of the novel compounds on such textile materials exhibit excellent fastness properties, for example, fastness to light and wet processing.

Illustrative of the diazo radicals from which the residues represented by A are derived are the thiazoles, benzothiazoles, 4,5,6,7-tetrahydrobenzothiazoles, pyrazoles, 1,3,4-thiadiazoles, isothiazoles, pyridines, quinolines, imidazoles, benzimidazoles, triazoles, oxazoles, benzoxazoles, indazoles, tetrazoles and indoles. The carbon atoms of the diazo radical, i.e., the groups collectively represented by A and the quaternary nitrogen atom in Formula I except, of course, the carbon atom attached to the azo group, can be substituted with various substituents including a fused carbocyclic ring which can also be substituted. Examples of such substituents are hydrogen, lower alkyl, lower alkoxy, lower alkanoylamino, aroylamino, nitro, halogen, cyano, lower alkylsulfonyl, arylsulfonyl, carbamoyl, lower alkylcarbamoyl, di-lower alkylcarbamoyl, benzamido, lower alkoxycarbonyl, hydroxy, lower alkanoyl, aroyl, lower alkylsulfonamido, sulfamoyl, lower alkylsulfamoyl, di-lower alkylsulfamoyl, thiocyanato, alkylthio, aryl, aryloxy, arylamino, etc. As used herein, the word "lower" denotes an alkyl moiety having up to about 4 carbon atoms.

Examples of the alkyl and alkoxy groups that can be present on the diazo component include methyl, ethyl, propyl, isopropyl, butyl, isobutyl, methoxy, ethoxy, propoxy, etc. Bromine and chlorine are representative of the halogen atoms. Acetyl, propionyl, butyryl, acetamido, propionimido, and butyramido are representative of the alkanoyl and alkanoylamino groups that can be present on the diazo component.

Typical alkylsulfonyl and alkylsulfonamido groups that can be present on the diazo component of the compounds of the invention are methylsulfonyl, ethylsulfonyl, propylsulfonyl, butylsulfonyl, 2-cyanoethylsulfonyl, methylsulfonamido, ethylsulfonamido, butylsulfonamido, etc. Examples of the alkoxycarbonyl groups include methoxycarbonyl, ethoxycarbonyl, propoxycarbonyl, butoxycarbonyl, etc. Typical of the alkyl groups of the alkylthio, substituted carbamoyl, and substituted sulfamoyl groups that can be present on the diazo component are methyl, ethyl, propyl, isopropyl, butyl, etc.

Examples of the aryl groups that can be present on the diazo compound include monocyclic, carbocyclic aryl such as phenyl and phenyl substituted with lower alkyl, lower alkoxy, halogen, nitro, cyano, etc. The aryl moiety of the aroyl, aroylamino, arylamino, aryloxy, and arylsulfonyl groups can be unsubstituted, e.g., benzoyl, benzamido, phenylsulfonyl, or substituted with the groups mentioned above in the definition of aryl.

Any secondary nitrogen atoms present in the group represented by A can be substituted with lower alkyl, lower alkylsulfonyl, arylsulfonyl or aryl, as those groups are defined above. Examples of diazo groups containing a secondary nitrogen are the pyrazoles, the benzimidazoles, and the triazoles.

The examples and types of substituents described above are illustrative and not limitative. Various substituents that can be present on the diazo component will be apparent to those skilled in the art.

Examples of the alkyl groups represented by R include methyl, ethyl, propyl, isopropyl, butyl and phenylalkyl groups such as benzyl. Preferably R is methyl, ethyl, or benzyl.

The phenyl groups represented by $R^1$ can be unsubstituted or substituted with lower alkyl, lower alkoxy, halogen, nitro, cyano, lower dialkylamino, hydroxy, lower alkanoyloxy, etc. Specific examples of such phenyl groups include, but are not limited to, phenyl, p-tolyl, m-ethylphenyl, p-anisyl, o,p-dimethoxyphenyl, p-chlorophenyl, o-bromo-p-tolyl, o,p-dichlorophenyl, p-nitrophenyl, p-hydroxyphenyl, o,p - dihydroxyphenyl, p - dimethylaminophenyl and p-cyanophenyl.

The lower alkyl radicals which $R^2$ and $R^3$ can represent can be straight or branched-chain, unsubstituted or substituted alkyl. Examples of such unsubstituted alkyl radicals include methyl, ethyl, isopropyl, butyl, isobutyl, etc. The substituents set forth hereinabove that can be present on the diazo component of the novel cations of the invention are also illustrative of the substituents that can be can represent. Illustrative of such substituents are lower present on the substituted alkyl radicals which $R^2$ and $R^3$ alkoxy, e.g., 2-methoxyethyl, 2 - (2 - cyanoethoxy)ethyl; lower alkanoyl, e.g., 3-acetamidopropyl; hydroxy, e.g., 2-hydroxyethyl, 2,3-dihydroxypropyl, 3-chloro-2-hydroxypropyl; lower alkanoyloxy, e.g., 2-acetoxyethyl; lower alkanoyl, e.g., 2-propionylethyl; lower alkanoyl, e.g., 4-acetylbutyl; aroyl, e.g., 2-benzoylethyl, 3-p-toloylpropyl; cyano, e.g., 2-cyanoethyl; lower alkylsulfonyl, 2-methylsulfonylethyl; lower alkylsulfonamido, e.g., 3-methylsulfonamidopropyl; arylcarbamoyloxy, e.g. 2-phenylcarbamoly, oxyethyl; carbamoyl, e.g. 3-carbamoylpropyl; lower alkoxycarbonyl, e.g. 2-ethoxycarbonylethyl; sulfamoyl, e.g. 2-sulfamoylethyl; dicarboximido, e.g. 2-succinimidoethyl, glutarimidopropyl, 2-phthalimidoethyl; aryl, e.g. benzyl, 2-p-tolylethyl, 3-p-anisylpropyl, etc. The specific groups described as representative of the groups that can be present on the diazo component are further examples of the substituents that can be present on the substituted alkyl radicals represented by $R^2$ and $R^3$. When the alkyl radicals are substituted with a substituent which contains an alkyl moiety, e.g. alkoxyalkyl, such substituted alkyl radicals can contain up to about 8 carbon atoms.

The phenyl radicals which $R^2$ and $R^3$ can represent can be unsubstituted phenyl or substituted phenyl such as, for example, the phenyl radicals represented by $R^1$. The groups collectively represented by

can be unsubstituted or substituted, for example, with lower alkyl, halogen, lower alkoxy, etc. Examples of the groups collectively represented by

are piperidino, 3-methylpiperidino, 3,5 - dimethylpiperidino, morpholino, 3-propylmorpholino, N - thiomorpholine-1, 1-dioxide, etc.

Examples of the anions represented by X include $Cl^-$, $Br^-$, $I^-$, $CH_3SO_4^-$, $C_6H_5SO_3^-$, etc., the anion depending upon the method of isolation utilized and the particular quaternizing agent employed. The anion does not affect the utility of the compounds of the invention as dyes nor does it affect the dye affinity of the compounds for polyacrylonitrile textile materials. When the compounds are used to dye polyacrylonitrile textile material, the anion becomes associated with a positively charged ion derived from the polyacrylonitrile and is removed from the dye cation and polyacrylonitrile textile material, either in the dyebath or in a subsequent washing of the dyed polyacrylonitrile textile material. Since the cation of a cationic azo dye is responsible for the color of the compound, the particular anion associated with the cation is not important.

The novel unquaternized dyes from which certain of the novel cationic azo compounds of the invention are prepared have the general formula (II) 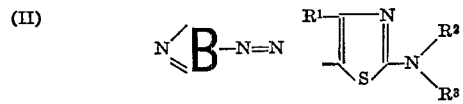

wherein

B represents the remainder of a 5 or 6 membered aromatic ring system attached to the azo group through a ring carbon atom in which ring system the non-azo nitrogen atom adjacent to B is a ring member, the ring atoms of B consisting of carbon and at least one sulfur or nitrogen atom, the non-azo nitrogen atom adjacent to B being connected to the azo group through a continuous chain of conjugation; and $R^1$, $R^2$ and $R^3$ are defined above, The carbon atoms of the residue represented by B can be substituted as described above for the residue A of the novel cations of the invention. Illustrations of the diazo components from which the residues represented by B are set forth above relative to the description of the residue A, excluding, of course, the benzoxazole, pyridines, quinolines, indoles, oxazoles, etc., which are not included in the definition of B.

Particularly good dyeings on acrylic, modacrylic, and acid-modified polyester textile materials are obtained from the compounds of Formula I in which the diazo component

is an azole group having the formula

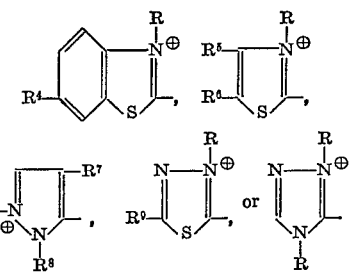

wherein

R represents methyl or ethyl;

$R^4$ represents hydrogen, lower alkyl, lower alkoxy, bromine or chlorine;

$R^5$ represents hydrogen, lower alkyl, phenyl, or phenyl substituted with lower alkyl;

$R^6$ represents hydrogen, thiocyanato, lower alkyl, halogen, or lower alkylsulfonyl;

$R^7$ represents hydrogen, lower alkyl, cyano, lower alkoxycarbonyl, carbamoyl, phenyl, or phenyl substituted with lower alkyl;

$R^8$ represents lower alkyl, phenyl, lower alkylphenyl, lower alkylsulfonyl, phenylsulfonyl, or lower alkylphenylsulfonyl;

$R^9$ represents hydrogen, lower alkylthio, phenyl, or phenyl substituted with lower alkyl;

and in the coupling component of Formula I $R^1$ represents phenyl or phenyl substituted with lower alkyl, lower alkoxy, or hydroxy;

$R^2$ represents hydrogen, lower alkyl, phenyl or phenyl substituted with lower alkyl; and $R^3$ represents hydrogen or lower alkyl.

The novel compounds of the invention in which A and B are the same can be prepared by treating the compounds of Formula II with an alkylating agent in the presence or absence of an inert solvent and at elevated temperatures. Examples of suitable solvents include chlorobenzene, toluene, 1,2-dichlorobenzene, triethylphosphate, dimethylformamide, etc. Suitable alkylating agents that can be used are the dialkyl sulfates, the alkyl halides, the aralkyl halides, the alkyl esters of aryl sulfonic acids, etc. Examples of such alkylating agents include dimethyl sulfate, diethyl sulfate, dipropyl sulfate, ethyl bromide, butyl bromide, methyl iodide, ethyl iodide, benzyl chloride, benzyl bromide, methyl-p-toluene sulfonate, butyl-p-toluene sulfonate, and ethyl benzenesulfonate.

The azo compounds of the invention having Formula II are prepared according to well-known procedures by diazotizing an amine having the formula (III) 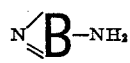

and coupling the resulting diazonium salt with a thiazole coupler having the formula (IV) 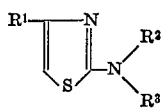

wherein B, R¹, R², and R³ are defined above.

The amines of Formula III are commercially available or can be prepared according to published techniques. Examples of such amines useful in preparing the novel compounds and cations of the invention are 2-aminothiazole,
2-amino-4-phenylthiazole,
2-amino-4-p-anisylthiazole,
2-amino-4-p-bromophenylthiazole,
2-amino-4,5-dimethylthiazole,
2-amino-5-nitrothiazole,
2-amino-5-methylsulfonylthiazole,
2-amino-5-thiocyanatothiazole,
2-amino-5-ethoxycarbonylmethylthiothiazole,
2-amino-5-bromothiazole,
2-aminobenzothiazole,
2-amino-6-methylsulfonylbenzothiazole,
2-amino-6-methylbenzothiazole,
2-amino-6-methoxybenzothiazole,
2-amino-6-ethoxybenzothiazole,
2-amino-4,7-dimethoxybenzothiazole,
2-amino-5,6-dimethylbenzothiazole,
2-amino-4,6-dichlorobenzothiazole,
2-amino-6-methylthiobenzothiazole,
2-amino-6-(2-cyanoethylthio)-benzothiazole,
2-amino-6-cyanobenzothiazole,
2-amino-6-nitrobenzothiazole,
2-amino-6-sulfamoylbenzothiazole,
2-amino-6-dimethylsulfamoylbenzothiazole,
2-amino-6-trifluoromethylbenzothiazole,
2-amino-5-methyl-6-acetylbenzothiazole,
2-amino-6-ethoxycarbonylbenzothiazole,
2-amino-6-acetamidobenzothiazole,
2-amino-6-methylsulfonamidobenzothiazole,
2-amino-6-thiocyanato-benzothiazole,
2-amino-6-carbamoylbenzothiazole,
2-amino-4,5,6,7-tetrahydrobenzothiazole,
2-amino-5,5-dimethyl-7-oxo-4,5,6,7-tetrahydrobenzothiazole,
2-amino-5-methylthio-1,3,4-thiadiazole,
2-amino-5-(ethoxycarbonylmethylthio)-1,3,4-thiadiazole,
2-amino-5-methylsulfonyl-1,3,4-thiadiazole,
3-amino-1,2,4-triazole,
2-aminobenzimidazole,
2-amino-5-methylbenzimidazole,
2-amino-6-methylsulfonylbenzimidazole,
2-amino-6-chlorobenzimidazole,
3-aminodiazole,
3-aminoisothiazole,
3-amino-5-nitroisothiazole,
3-amino-4,5-dimethylisothiazole,
3-aminopyrazole,
5-amino-4-cyano-1-phenylsulfonylpyrazole,
3-amino-4-cyanopyrazole,
3-amino-4-nitropyrazole,
3-amino-4-ethylpyrazole,
3-amino-4-ethoxycarbonylpyrazole,
3-amino-4-methoxycarbonyl-2-phenylpyrazole,
5-aminotetrazole, etc.

In general, any amino-cyclic compound which can be diazotized, and conforms with the definition of the diazo component in Formula I, can be used to prepare the novel compounds of the invention.

The thiazole coupling components represented by Formula IV can be prepared by well-known procedures. For example, a thiourea compound can be reacted with a carbonylhalide compound according to the following equation:

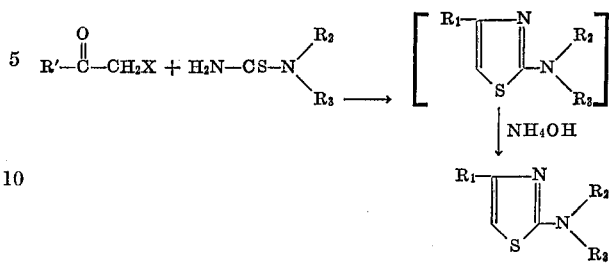

Examples of the thiazoles useful in preparing the novel compounds and cations of the invention include 2-amino-thiazole,
2-amino-4-methylthiazole,
2-amino-4-ethylthiazole,
2-amino-4-phenylthiazole,
2-amino-4-p-methoxyphenylthiazole,
2-amino-4-p-bromophenylthiazole,
2-methylaminothiazole,
2-methylamino-4-methylthiazole,
2-methylamino-4-phenylthiazole,
2-dimethylaminothiazole,
2-dimethylamino-4-methylthiazole,
2-dimethylamino-4-phenylthiazole,
2-dimethylamino-4-p-methoxyphenylthiazole,
2-dimethylamino-4-(p-dimethylaminophenyl) thiazole,
2-(N-methyl-N-phenylamino)-thiazole,
2-(N-methyl-N-phenylamino)-4-methylthiazole,
2-(N-methyl-N-phenylamino)-4-phenylthiazole,
2-(N-methyl-N-phenylamino)-4-p-methoxyphenylthiazole,
2-morpholinothiazole,
2-morpholino-4-methylthiazole,
2-morpholino-4-phenylthiazole,
2-morpholino-4-p-methoxyphenylthiazole,
2-piperidinothiazole,
2-piperidino-4-phenylthiazole,
2-piperidino-4-methylthiazole,
2-(N-ethyl-N-phenylamino)-thiazole,
2-(N-ethyl-N-phenylamino)-4-methylthiazole,
2-(N-ethyl-N-phenylamino)-4-phenylthiazole,
2-(N-methyl-N-m-tolylamino)thiazole,
2-(N-methyl-N-m-tolylamino)-4-phenylthiazole,
2-(N-methyl-N-p-tolylamino)-4-phenylthiazole, and the like.

The novel cationic monoazo compounds of the invention can also be prepared by the oxidative coupling technique described in U.S. Pat. 3,043,828. This technique comprises reacting a hydrazone having the formula (V) 

with a thiazole compound of Formula IV in the presence of a dehydrogenating or oxidizing agent. In Formula V, H represents the residue corresponding to A in Formula I except that the unsaturation in H is so arranged that one of the double bonds is external on the ring as shown in (V) and in U.S. Pat. 3,043,828. Examples of such hydrazones are 3-methyl-2-thiazolone-hydrazone, 3-ethyl-2-benzothiazolone-hydrazone, 1-methyl-2-pyridone - hydrazone, 1-methyl-4-pyridone - hydrazone, 3-methyl-2-benzoxazolone-hydrazone, 1-methyl-2-quinolinone-hydrazone, 1,3,3-trimethyl-2-oxindole-hydrazone, etc. The hydrazones of Formula V can be substituted with the substituents which can also be present on the group represented by A.

Such hydrazones can be prepared by published techniques such as described in the patent mentioned hereinbefore.

The following examples further illustrate the preparation of representative intermediates and compounds.

PREPARATION OF THE AMINOTHIAZOLE COUPLERS

Example 1

Preparation of 2-(N,N-dimethylamino)-4-phenylthiazole hydrobromide.—A solution of 15.6 g. of N,N-dimethylthiourea in 100 ml. of absolute ethanol is treated cautiously with 29.8 g. of phenacylbromide by portionwise addition of the solid. After the mild exothermic reaction has subsided the reaction is completed by heating for 2 hrs. at reflux. Upon cooling, the solid is filtered off to give a 98% yield 2-(N,N-dimethylamino)-4-phenylthiazole hydrobromide.

*Analysis.*—C, calc. 46.3%, found 46.3%; H, calc. 4.6%, found 4.7%; N, calc. 9.8%, found 9.7%.

Example 2

Preparation of 2 - (N - methyl-N-phenylamino)-4-p-methoxyphenylthiazole hydrobromide.—N - methyl-N-phenyl-2-thiourea (10.8 g.) is dissolved in absolute ethanol (50 ml.). To this solution is added p-methoxyphenacylbromide (15.0 g.) and a mild exothermic reaction occurs. This solution is heated for 2 hrs. at reflux. The reaction mixture is allowed to cool, then drowned into ether (400 ml.). There is obtained a 91.3% yield of product.

Example 3

Preparation of 2-morpholino-4-phenylthiazole hydrobromide.—N-thiocarbamoylmorpholine (14.6 g.) is dissolved in absolute ethanol (100 ml.). To this solution is added bromoacetophenone (20.0 g.). The resulting solution is heated for 6 hrs. at reflux and upon cooling is drowned into ether (400 ml.) and filtered to give a 62% yield of product.

Example 4

Preparation of 2-(N-ethyl-N-phenylamino)-4-phenylthiazole hydrobromide.—N-ethyl-N-phenylthiourea (36.0 g.) is dissolved in absolute ethanol (100 ml.). To this solution is added bromoacetophenone (40.0 g.); a mild exothermic reaction occurs. The resulting mixture is heated for 2 hrs. at reflux. Upon cooling a 97.5% yield of product is obtained.

Example 5

2-amino-4-methylthiazole (1.45 g.) is dissolved in 6.8 ml. of conc. $H_2SO_4$ and 12.5 ml. of water at about room temperature. This solution is treated with a solution of nitrosyl sulfuric acid containing .76 g. of $NaNO_2$ below —5° C. The diazotization is complete after 15 minutes at —5 to —10° C. This solution is added to a suspension of 2.0 g. of 2-(N,N-dimethylamino)-4-phenylthiazole hydrobromide. The coupling mixture is buffered to a pH of 4 to 5 by addition of solid ammonium acetate. After intermittent stirring for two hours, the product is collected on a funnel, washed well with water and dried at room temperature. The azo compound (1 g.) prepared is dissolved in 25 ml. of dry chlorobenzene by heating. Dimethylsulfate (3 ml.) is added to the solution and the quaternization is completed by heating at 95° C. for 1½ hours. On cooling, the product separates from the reaction mixture. The cation obtained imparts fast violet shades to acrylic fibers and has the structure:

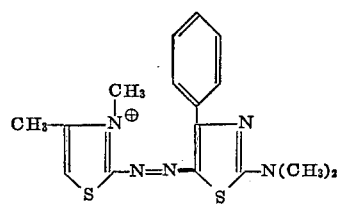

Example 6

The procedure described in Example 5 is repeated using 2.2 g. of 2-amino-4-phenylthiazole in place of 2-amino-4-methylthiazole. The cation obtained imparts a fast violet shade to acrylic fibers and has the formula:

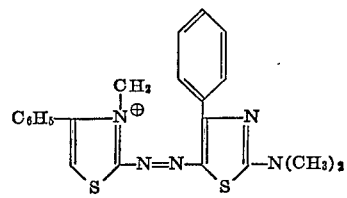

Example 7

10 ml. of 1–5 acid (propionic to acetic) are added below 20° C. to a solution of nitrosyl sulfuric acid prepared from 0.72 g. of $NaNO_2$ and 5 ml. of concentrated $H_2SO_4$. 1 g. of 2-aminothiazole is then added keeping the temperature below 5° C., followed by a second 10 ml. portion of 1–5 acid at the same temperature. The diazotization is complete after stirring at 3–5° C. for 2 hours. The diazo solution is added to a suspension of 2.9 g. of 2-(N-ethyl-N-phenylamino) - 4 - p-hydroxyphenylthiazole. The pH of the coupling solution is raised to 4 by addition of solid $NH_4OAc$. After the coupling is complete the azo compound is collected on a filter, washed with water and dried at room temperature. The azo compound (1 g.) is heated in 10 ml. of diethylsulfate on a steam bath for 2½ hours. The reaction mixture is drowned in ether and the precipitated dye is collected on a funnel, washed with ether and dried. The cation obtained gives fast, violet dyeings on acrylic and modacrylic fibers and has the structure:

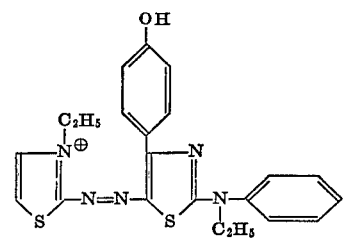

The cations set forth in Table I are prepared according to the procedures described in Examples 5 through 7 and conform to the general formula

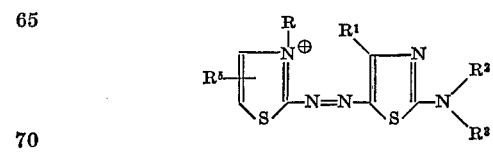

The color given for each example of Table I refers to the color which the cation imparts to acrylic fibers.

TABLE I

| Example number | R⁵ | R | R¹ | R² | R³ | Color |
|---|---|---|---|---|---|---|
| 8 | 5-Br | CH₃— | C₆H₅— | C₆H₅— | H | Reddish-blue. |
| 9 | 4-C₆H₅ | CH₃— | C₆H₅— | C₆H₅— | H | Do. |
| 10 | H | CH₃— | C₆H₅— | C₆H₅— | CH₃— | Do. |
| 11 | 5-Br | CH₃— | C₆H₅— | C₆H₅— | CH₃— | Do. |
| 12 | 4-C₆H₅ | CH₃— | C₆H₅— | C₆H₅— | CH₃— | Do. |
| 13 | 5-Br | CH₃— | C₆H₅— | p-CH₃C₆H₄— | CH₃— | Do. |
| 14 | 4-C₆H₅— | CH₃— | C₆H₅— | p-CH₃—C₆H₄— | CH₃— | Do. |
| 15 | 5-Br | CH₃— | C₆H₅— | p-CH₃O—C₆H₄— | H | Do. |
| 16 | 5-Br | CH₃— | C₆H₅— | m-CH₃—C₆H₄ | C₂H₅— | Do. |
| 17 | 4-C₆H₅— | CH₃— | C₆H₅— | m-CH₃—C₆H₄— | C₂H₅— | Do. |
| 18 | H | CH₃— | C₆H₅— | CH₃— | CH₃— | Red-violet. |
| 19 | 4-C₆H₅— | CH₃— | C₆H₅— | CH₃— | CH₃— | Violet. |
| 20 | 4-C₆H₅-5-CH₃ | C₂H₅— | n-C₄H₉— | n-C₃H₇— | n-C₃H₇— | Do. |
| 21 | 4-C₆H₅-5-SCN | CH₅ | p-CH₃—C₆H₅— | —NR²R³-morpholino | | Do. |
| 22 | 5-SCN-4-CH₃ | | p-Cl—C₆H₅— | —NR²R³-piperidino | | Do. |
| 23 | 5-CH₃CO | C₂H₅— | p-Br-C₆H₅— | C₄H₉— | Cyclohexyl | Do. |
| 24 | H | C₆H₅CH₂— | o p-dl-CH₃O—C₆H₃— | C₆H₅— | C₄H₉— | Do. |
| 25 | H | CH₃ | C₆H₅— | HOCH₂CH₂— | HOCH₂CH₂ | Reddish-blue. |

Example 26

1.50 g. of 2-aminobenzothiazole is dissolved in 24 ml. of water and 14 ml. of H₂SO₄. The solution is cooled to 0° C. and a solution of .72 g. of NaNO₂ in 5 ml. of H₂SO₄ is added at 0 to 5° C. The diazotization is completed by stirring at 3 to 5° C. for two hours. It is added to a finely divided suspension of 3.6 g. of 2-(N-methyl-N-phenylamino)-4-phenylthiazole hydrobromide in 400 ml. of water. The coupling mixture is treated with solid ammonium acetate to bring the pH to about 4.5. After intermittent stirring for two hours the azo product is collected, washed well with water and dried. 0.5 g. of the azo compound is heated at 95° C. in 7 ml. of dimethylsulfate for 1 hour. The bluish solution is drowned in ether and the gummy precipitate is isolated by decantation. Water is added and the product dissolved by heating. After the addition of a small amount of charcoal, the solution is filtered and the dye is precipitated by the addition of sodium iodide. This cation imparts fast blue shades to acrylic fibers and has the structure:

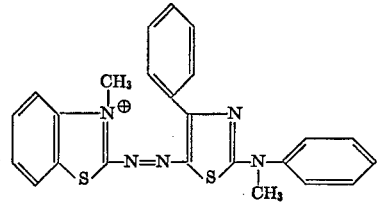

Example 27

2-amino-6-methylsulfonylbenzothiazole (2.28 g.) is dissolved in 50 g. of 50% H₂SO₄. A solution of .72 g. of NaNO₂ in 5 ml. of conc. H₂SO₄ is added to this solution keeping the temperature below 5° C. The diazotization is completed by stirring for two hours at 3–5° C. This diazo solution is added to a suspension 3.3 g. of 2-anilino-4-phenylthiazole hydrobromide and the coupling is carried out as described in Example 26. 1 g. of the azo compound obtained is treated with dimethylsulfate as described in Example 26. The cation obtained gives fast reddish-blue dyeings on acrylic fibers and has the formula:

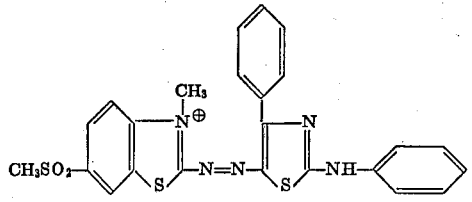

Example 28

A solution of nitrosyl sulfuric acid prepared from .72 g. of NaNO₂ and 5 ml. of H₂SO₄ is treated with 10 ml. of 1:5 acid (1 part propionic acid:5 parts acetic acid) below 20° C., then 1.75 g. of 2-amino-6-cyanobenzo-thiazole is added keeping the temperature below 5° C. A second portion of 10 ml. of 1:5 acid is added at 3–5° C. and the diazotization completed by stirring two hours at this temperature. This diazonium sulfate solution is reacted with 2.0 g. of 2-N,N-dibutylamino-4-phenylthiazole suspended in 400 cc. of water and the coupling and isolation of the azo compound is carried out as described in Example 26. 1 g. of the azo compound is quaternized with dimethylsulfate according to the procedure of Example 26. The resulting cation dyes acrylic fibers a reddish-blue shade and has the structure:

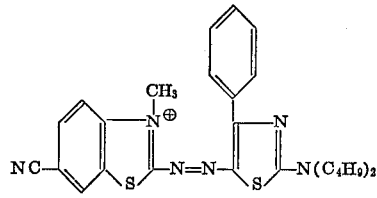

Example 29

.72 g. of NaNO₂ is dissolved in 5 ml. of concentrated H₂SO₄ allowing the temperature to rise to about 65° C. 10 ml. of 1–5 acid is added below 20° C. followed by 1.8 g. of 2-amino-6-methoxybenzothiazole at 0 to 5° C. Then a second 10 ml. portion of 1–5 acid is added below 5° C. The diazotization is completed by stirring at 3 to 5° C. for 2 hours. The diazo solution is added to a cooled aqueous suspension of 2.03 g. of 2-(N,N-dimethylamino-4-phenylthiazole. The mineral acid is neutralized by addition of solid ammonium acetate keeping the temperature below 10° C. After 2 hours the coupling mixture is drowned in 600 ml. of water and the product is filtered and washed well with water. This azo compound (1 g.) is dissolved in 25 ml. of dry chlorobenzene by heating. 3 ml. of dimethylsulfate are added to the solution and quaternization is completed by heating at 95° C. for 1½ hours. On cooling, the product separates from the reaction mixture. This cation imparts fast blue shades to acrylic fibers and has the structure:

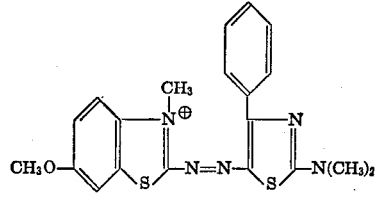

Example 30

2.3 g. of 2-(N,N-dimethylamino) - 4 - anisylthiazole is substituted for the coupler in Example 29. Diazotization and coupling are carried out as described in the preceding example. The azo compound (1 g.) obtained is quaternized in 30 ml. of chlorobenzene with 5 ml. of dimethylsulfate by heating 2 hours at 95° C. The cation obtained imparts a fast blue shade to acrylic fibers.

Example 31

1 g. of 3-methylbenzothiazole - 2 - hydrazone and 1 g. of 2 - dimethylamino - 4 - phenylthiazole are slurried in 150 ml. of dilute HCl with the aid of a wetting agent such as Triton X–102. This slurry is stirred and treated with 25 ml. of a 20% FeCl₃ solution. After stirring overnight at room temperature the oxidative coupling is complete. The crude dye is collected on a funnel, washed with 10% NaCl solution and then dissolved in 350 ml. of water by heating. The solution was filtered and the dye is precipitated with sodium iodide. This cation imparts red-violet shades to acrylic fibers and has the formula:

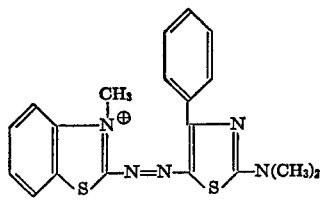

According to the procedure described in Example 26, the following cations are prepared by diazotizing the appropriate hydrogenated derivative of 2 - aminobenzothiazole, coupling the diazonium salts with the appropriate thiazole coupler, and quaternizing the resulting azo compound with dimethyl sulfate. The cations give fast dyeings on acrylic fibers of the shade indicated adjacent to each compound.

Example 32

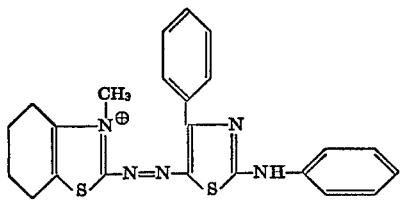

blue

Example 33

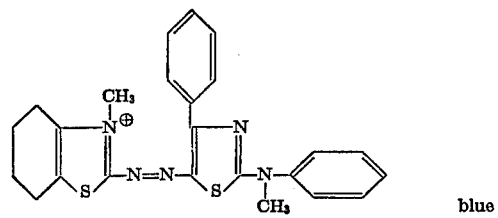

blue

Example 34

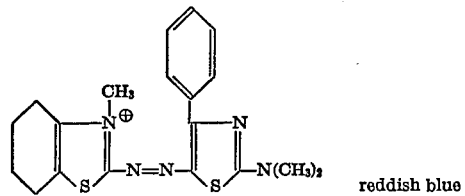

reddish blue

Example 35

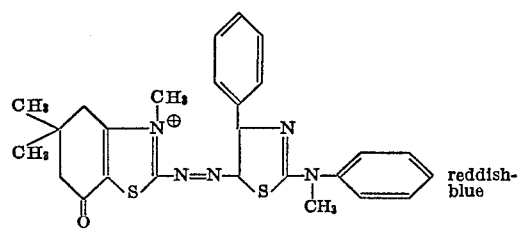

reddish-blue

The cations of the examples of Table II are prepared by making the intermediate azo compound and quaternizing it as described in Examples 26 through 30. The color given for each of the cations of Table II, which correspond to the formula

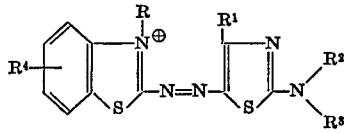

refers to dyeings on acrylic fibers.

TABLE II

| Example number | R⁴ | R | R¹ | R² | R³ | Color |
|---|---|---|---|---|---|---|
| 36 | 6-OCH₃ | CH₃— | C₆H₅— | C₆H₅— | H | Blue. |
| 37 | 6-SCH₃ | CH₃— | C₆H₅— | C₆H₅— | CH₃— | Reddish-blue. |
| 38 | 6-SCN | CH₃— | C₆H₅— | C₆H₅— | CH₃— | Do. |
| 39 | 6-OCH₃ | CH₃— | C₆H₅— | C₆H₅— | CH₃— | Blue. |
| 40 | 6-SCN | CH₃— | C₆H₅— | m-CH₃—C₆H₅— | CH₃— | Violet. |
| 41 | 6-Cl | CH₃— | C₆H₅— | m-CH₃—C₆H₅ | CH₃— | Do. |
| 42 | 6-SCH₃ | C₂H₅— | C₆H₅— | m-CH₃—C₆H₅— | CH₃— | Reddish-blue. |
| 43 | 6-OCH₃ | C₂H₅— | C₆H₅— | m-CH₃—C₆H₅— | CH₃— | Blue. |
| 44 | 6-OCH₃ | CH₃— | H | H | H | Violet. |
| 45 | 6-OCH₃ | CH₃— | H | CH₃— | CH₃— | Do. |
| 46 | 6-OCH₃ | CH₃— | CH₃— | CH₃— | CH₃— | Reddish-blue. |
| 47 | 6-SO₂CH₃ | CH₃— | C₆H₅— | C₆H₅— | C₂H₅— | Red-violet. |
| 48 | 6-OCH₃ | CH₃— | C₆H₅— | C₆H₅— | C₂H₅— | Blue. |
| 49 | H | CH₃— | C₆H₅— | C₆H₅— | C₂H₅— | Violet. |
| 50 | 6-OCH₃ | CH₃— | C₆H₅— | p-CH₃O—C₆H₄— | H | Blue. |
| 51 | 6-SCN | CH₃— | C₆H₅— | p-CH₃O—C₆H₄— | H | Violet. |
| 52 | 6-OCH₃ | CH₃— | p-CH₃O—C₆H₄— | C₆H₅— | CH₃— | Green. |
| 53 | H | CH₃— | p-CH₃O—C₆H₄— | C₆H₅— | CH₃— | Blue. |
| 54 | 6-Cl | CH₃— | p-CH₃—C₆H₄— | C₆H₅— | CH₃— | Do. |
| 55 | 6-OCH₃ | CH₃— | C₆H₅ | m-CH₃—C₆H₄— | C₂H₅— | Do. |
| 56 | 6-SCH₃ | CH₃— | C₆H₅— | CH₃— | CH₃— | Violet. |
| 57 | 6-SCN | CH₃— | C₆H₅— | CH₃— | CH₃— | Do. |
| 58 | 6-Cl | CH₃— | C₆H₅— | CH₃— | CH₃— | Red-violet. |
| 59 | 4,6-di-Cl | C₂H₅— | C₆H₅— | H | H | Violet. |
| 60 | 6-NO₂ | CH₃— | o,p-di-HO—C₆H₃— | C₆H₅— | CH₃— | Reddish-blue. |
| 61 | 6-SO₂NH₂ | C₆H₅CH₂— | n-C₄H₉— | CH₃— | C₆H₅CH₂— | Violet. |
| 62 | 6-CF₃ | C₃H₇— | H | —CH₂CH₂Br | —CH₂CH₂Br | Do. |
| 63 | 6-COOC₂H₅ | CH₃— | p-Cl-C₆H₄— | Cyclohexyl | CH₃— | Reddish-blue. |
| 64 | 6-CH₃CO— | CH₃ | C₆H₅— | —NR²R³=morpholino | | Do. |
| 65 | 6-OCH₃ | CH₃ | CH₃ | C₄H₉— | C₄H₉— | Blue. |
| 66 | 4,7-di-OCH₃ | CH₃ | C₆H₅— | CH₃ | CH₃ | Do. |
| 67 | 6-NHCOCH₃ | C₂H₅ | p-HO—C₆H₄— | C₆H₅— | CH₃ | Do. |
| 68 | 4,6-di-CH₃ | CH₃ | C₆H₅ | CH₃ | CH₃ | Reddish-blue. |
| 69 | CH₃SO₂NH— | CH₃ | C₆H₅ | C₆H₅ | CH₃ | Do. |
| 70 | 6-OC₂H₅ | CH₃ | C₆H₅ | CH₃ | CH₃ | Blue. |

Example 71

3-amino-1(H),1,2,4-triazole (0.84 g.) is dissolved in acetic acid (10 ml.) and conc. HCl (3 ml.). This solution is cooled to 0° C. and treated with a solution of NaNO₂ (0.72 g.) in water keeping the temperature below 5° C. After the diazotization is complete, the solution is added to an ice cooled suspension of 2.03 g. 2-(N,N-dimethylamino)-4-phenylthiazole in 1–5 acid (20 ml.). The coupling mixture is neutralized by addition of solid NH₄OAc keeping the temperature below 10° C. After completion of coupling (as shown by a negative R-salt test) water is added and the azo product collected, washed with water and air dried. 1 g. of the azo compound is dissolved in 5 ml. of dimethylformamide and treated with 2 ml. of dimethylsulfate. After heating for 2 hours on a steam bath, the solution is drowned in 200 ml. of water containing 3 ml. of concentrated HCl, 2 g. of ZnCl₂ and 30 g. of NaCl. The precipitated dye is collected on a funnel, washed with 5 ml. of water and air dried. This cation gives red dyeings having excellent fastness properties on acrylic fibers. It has the structure:

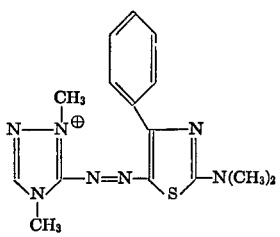

Example 72

2-(N-methyl-N-phenylamino)-4-phenylthiazole is substituted for the coupler in Example 71 and the resulting dye is quaternized to yield a cation which imparts very fast bluish-red shades to acrylic fibers.

The cations set forth in Table III are prepared according to the procedure described in Example 71 and have the general formula

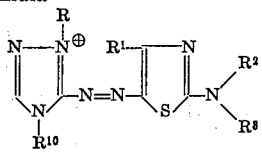

The color given for each cation refers to dyeings on acrylic fibers.

TABLE III

| Example No. | R¹⁰ | R | R¹ | R² | R³ | Color |
|---|---|---|---|---|---|---|
| 73 | CH₃— | CH₃— | C₆H₅— | C₆H₅— | H | Red. |
| 74 | CH₃— | CH₃— | C₆H₅— | p-CH₃—C₆H₄— | CH₃— | Red. |
| 75 | CH₃— | CH₃— | C₆H₅— | m-CH₃C₆H₄— | C₂H₅— | Red. |
| 76 | C₂H₅— | C₂H₅— | C₂H₅— | H | H | Red. |
| 77 | C₆H₅— | CH₃— | H | CH₃ | CH₃ | Red. |
| 78 | C₆H₅SO₂— | CH₃— | p-CH₃O—C₆H₄— | —NR²R³=piperidino | | Red. |
| 79 | C₂H₅ | C₆H₅CH₂— | p-HO—C₆H₄ | p-CH₃O—C₆H₅— | H | Red. |
| 80 | CH₃ | CH₃ | C₆H₅ | C₄H₉— | H | Red. |
| 81 | CH₃SO₂ | CH₃ | C₆H₅ | C₂H₅ | C₂H₅ | Red. |
| 82 | CH₃ | CH₃ | C₆H₅ | C₄H₉ | C₄H₉ | Red. |
| 83 | CH₃ | CH₃ | C₆H₅ | —NR²R³=morpholino | | Red. |

Example 84

0.72 g. of NaNO₂ are added to 5 ml. of H₂SO₄ keeping the temperature below 70° C. 10 ml. of 1–5 acid are added to the nitrosyl sulfuric acid below 20° C., then with further cooling at 0 to 5° C. 1.47 g. of 2-amino-5-methylthio-1,3,4-thiadiazole are added. A second portion of 10 ml. of 1–5 acid is added below 5° C. and the diazotization is completed by stirring for two hours at 3 to 5° C. This diazo solution is then added to a suspension of 2.52 g. of 2-anilino-4-phenylthiazole in 400 ml. of water. The coupling mixture is buffered to a pH of 4 to 5 by addition of solid ammonium acetate. After intermittent stirring for two hours, the azo compound is collected on a funnel, washed well with water and dried at room temperature. This compound (1 g.) is heated in 5 ml. of dimethylsulfate at 95–100° C. for ½ hour. The solution is drowned in ether and the precipitate is filtered off, dissolved in water and re-precipitated after the addition of sodium iodide. The cation obtained gives red-violet dyeings on acrylic fibers and has the formula:

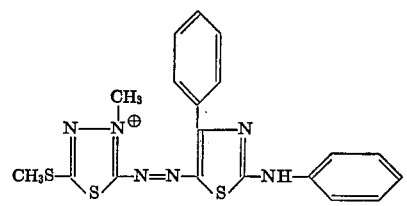

The cations of Table IV are prepared according to the procedure of Example 84 and conform to the formula

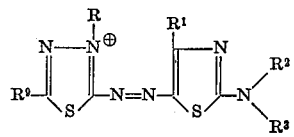

As in the preceding examples, the color given for the cations of Table IV refers to dyeings on acrylic fibers.

TABLE IV

| Example number | R⁹ | R | R¹ | R² | R³ | Color |
|---|---|---|---|---|---|---|
| 85 | H | CH₃— | C₆H₅— | C₆H₅— | CH₃— | Bluish-red. |
| 86 | CH₃S— | CH₃— | C₆H₅— | C₆H₅— | CH₃— | Do. |
| 87 | H | CH₃— | C₆H₅— | C₆H₅— | C₂H₅— | Do. |
| 88 | CH₃S— | CH₃— | C₆H₅— | C₆H₅— | C₂H₅— | Red-violet. |
| 89 | CH₃S— | CH₃— | C₆H₅— | m-CH₃—C₆H₄— | C₂H₅— | Do. |
| 90 | H | CH₃— | H | CH₃— | CH₃— | Red. |
| 91 | CH₃S— | CH₃— | H | CH₃— | CH₃— | Bluish-red. |
| 92 | C₂H₅OOCCH₂S— | CH₃— | C₄H₉— | CH₃— | CH₃— | Red-violet. |
| 93 | CH₃SO₂— | CH₃— | p-HO—C₆H₄— | C₃H₇— | C₃H₇— | Do. |
| 94 | H | C₂H₅— | C₆H₅— | —CH₂CH₂CN | —CH₂CH₂CN | Do. |
| 95 | H | CH₃ | C₆H₅ | —NR²R³-piperidino | | Do. |
| 96 | | | | —NR²R³-morpholino | | Do. |
| 97 | CH₃S— | | | —NR²R³-morpholino | | Do. |

Example 98

Ten ml. of 1:5 acid (1 part propionic to 5 parts acetic) is added to nitrosylsulfuric acid prepared from sodium nitrile (0.72 g.) and sulfuric acid (5 ml.). This solution is cooled to 3° C. and 3-amino-4-cyano-2-phenylpyrazole (2.48 g.) is added, keeping the temperature at 5° C. or below. A second 10 ml. position of 1:5 acid is added and the diazotization is completed by stirring for 2 hours at 3 to 5° C. This solution is added to a cooled solution of 3.33 g. of 2-anilino-4-phenylthiazole hydrobromide. The pH of the coupling mixture is adjusted to 4–5 by the addition of solid ammonium acetate while keeping the temperature below 10° C. After coupling is complete, water is added and the azo compound is collected on a funnel, washed well with water and dried at room temperature. 0.5 g. of this azo compound is heated in 7 ml. of dimethylsulfate for 1 hour. The reaction mixture is drowned in ether and the liquid is decanted from the sticky precipitate. Water is added and the product is dissolved by heating, filtered hot and precipitated by the addition of sodium iodide after allowing to cool. The product is collected on a funnel and dried. This cation imparts a fast red shade to acrylic fibers and has the formula

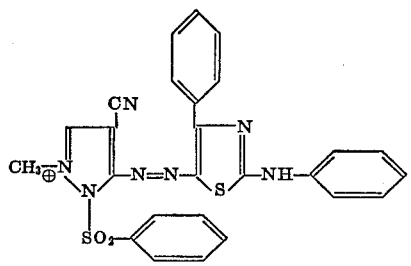

The cations of the examples of Table V are prepared in accordance with Example 98. The cations of Table V have the formula

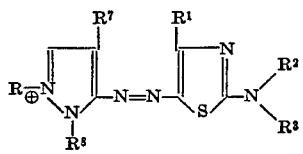

TABLE V

| Example number | $R^7$ | $R^8$ | R | $R^1$ | $R^2$ | $R^3$ | Color |
|---|---|---|---|---|---|---|---|
| 99 | $CH_3OOC$ | $C_6H_5-$ | $CH_3-$ | $C_6H_5-$ | $C_6H_5-$ | $C_2H_5-$ | Red-violet. |
| 100 | $C_6H_5-$ | $C_6H_5-$ | $CH_3-$ | $C_6H_5-$ | $C_6H_5-$ | H | Bluish-red. |
| 101 | $C_6H_5-$ | $C_6H_5-$ | $CH_3-$ | $C_6H_5-$ | $C_6H_5-$ | $CH_3-$ | Do. |
| 102 | $CH_3OOC-$ | $C_6H_5-$ | $CH_3-$ | $C_6H_5-$ | $C_6H_5-$ | $CH_3-$ | Red-violet. |
| 103 | $C_6H_5$ | $C_6H_5-$ | $CH_3-$ | $C_6H_5-$ | p-$CH_3-C_6H_4-$ | $CH_3-$ | Bluish-red. |
| 104 | $C_6H_5-$ | $C_6H_5-$ | $CH_3-$ | $C_6H_5-$ | m-$CH_3-C_6H_4-$ | $C_2H_5-$ | Do. |
| 105 | $C_6H_5-$ | $C_6H_5-$ | $CH_3-$ | $C_6H_5-$ | $CH_3-$ | $CH_3-$ | Do. |
| 106 | $CH_3OOC-$ | $C_6H_5-$ | $CH_3-$ | $C_6H_5-$ | $CH_3-$ | $CH_3-$ | Red. |
| 107 | CN | $C_6H_5SO_2-$ | $CH_3-$ | $C_6H_5-$ | $CH_3-$ | $CH_3-$ | Red. |
| 108 | CN | $CH_3SO_2$ | $CH_3-$ | $C_6H_5-$ | $CH_3-$ | $CH_3-$ | Red. |

The following benzimidazolium cations are prepared by procedures analogous to those described in the preceding examples. The color adjacent to the structure of each cation is the color which the particular cation imparts to acrylic fibers.

Example 109

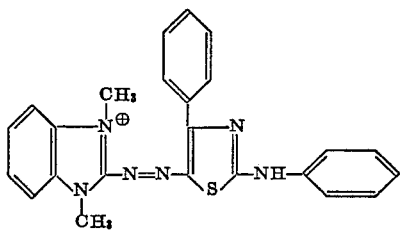

violet

Example 110

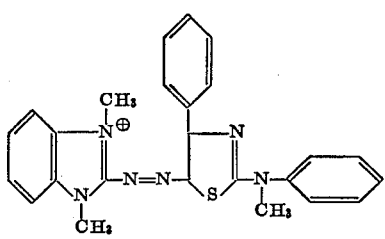

violet

Example 111

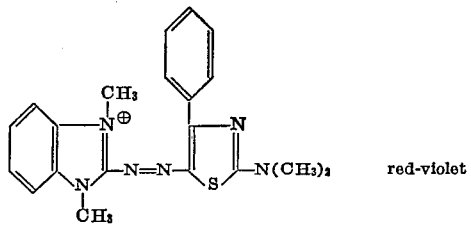

red-violet

The following cations are prepared by the oxidative coupling technique described in Example 31 by reacting the appropriate hydrazone with a thiazole coupler. The color given refers to dyeings on acrylic textile materials.

Example 112

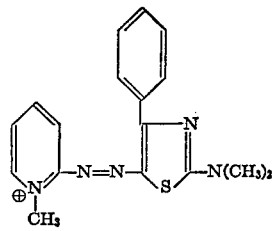

bluish-red

Example 113

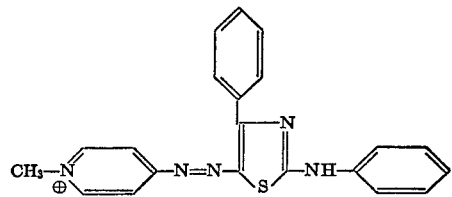

violet

Example 114

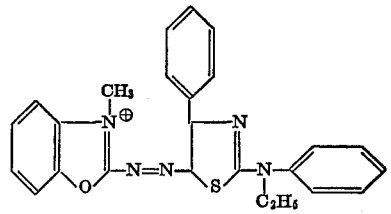

violet

Example 115

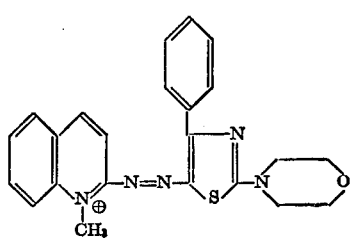

blue-violet

Example 116

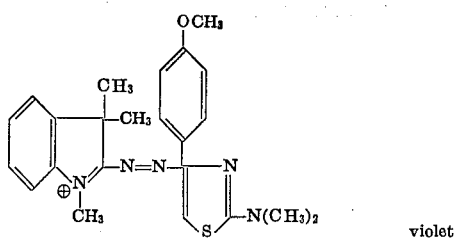
violet

The substituents present on the chain carbon atom of the residue represented by A and on the groups represented by $R^1$, $R^2$ and $R^3$ serve primarily as auxochromes to vary the color of the novel compounds of the invention. Various other such auxochrome groups that can be present on the novel cations will be apparent to those skilled in the art.

The monoazo compounds of the invention can be used for dyeing acrylic and modacrylic polymer fibers, yarns and fabrics a broad range of shades. Acrylic textile materials are those which consist of at least 85% acrylonitrile and modacrylic textile materials are those consisting of at least 35% but less than 85% acrylonitrile. The compounds of the invention also give excellent dyeings on acid-modified acrylic textile materials such as the sulfonate modified acrylic fibers described in U.S. Pats. 2,837,500, 2,837,501, and 3,043,811. The novel compounds can also be used to dye sulfonate modified polyester fibers such as are described in U.S. Pat. 3,018,272. Examples of the textile materials that are dyed with the compounds of the invention are those sold under the trade names "Orlon," "Orlon 42," "Verel," "Acrilan," "Dynel," "Creslan" and "Dacron 64." In general, the compounds, when used as dyes on the described textile materials, exhibit improved fastness, for example, to washing, to alkaline perspiration, wet-processing and light.

Textile materials dyed by the compounds of the invention are characterized by containing at least about 35% combined acrylonitrile units and up to about 95% acrylonitrile units, and modified, for example, by 65–5% of vinyl pyridine units as described in U.S. Pats. 2,990,393 (Re. 25,533) and 3,104,008 (Re. 25,539) or modified by 65–5% of vinylpyrrolidone units, for example, as described by U.S. Pat. 2,970,783, or modified with 65–5% acrylic ester or acrylamide units as described in U.S. Pats. 2,879,253, 2,879,254 and 2,838,470. Similar amounts of the other polymeric modifiers mentioned above are also useful. A preferred group of the copolymers readily dyeable with the dyes of the invention are the modacrylic polymers such as described in U.S. Pat. 2,831,826 composed of a mixture of (A) 70–95% by weight of a copolymer of from 30 to 65% by weight of vinylidene chloride or vinyl chloride and 70–35% by weight of acrylonitrile, and (B) 30–5% by weight of a second polymer from the group consisting of (1) homopolymers of acrylamidic monomers of the formula

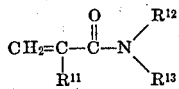

wherein $R^{11}$ is selected from the group consisting of hydrogen and methyl, and $R^{12}$ and $R^{13}$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

Another type of modacrylic polymer that can be dyed with the compounds of the invention is an acetone soluble mixture of (A) 70–95% by weight of a copolymer of 30–65% by weight of vinylidene chloride and 70–35% by weight of acrylonitrile and (B) 30–5% by weight of an acrylamide homopolymer having the above formula wherein $R^{11}$ and $R^{12}$ and $R^{13}$ are as described above. Specific polymers of that type contain 70–95% by weight of (A) a copolymer of from 30–65% by weight of vinylidene chloride and 70–35% by weight of acrylonitrile and (B) 30–5% by weight of a lower N-alkylacrylamide polymer such as poly-N-methacrylamide, poly-N-isopropylacrylamide and poly-N-tertiarybutylacrylamide.

The following example illustrates one way in which the compounds of the invention can be used to dye acrylonitrile polymer textile material.

Example 117

0.1 gram of the cationic dye is dissolved by warming in 5 cc. of 2-methoxyethanol. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 cc. with warm water. Five cc. of a 5% aqueous solution of formic acid or acetic acid are added and then 10 grams of fabric made from an acrylic fiber is entered and, in the case of "Orlon 42" acrylic textile material, the dyeing is carried out at the boil for one hour. In the case of materials made of "Verel" modacrylic fiber the dyebath temperature should not exceed 90° C. in order to avoid damage to the fiber. The dyed material is then washed well with water and dried.

A method by which the novel compounds can be applied to acid-modified polyester materials is described in the following example.

Example 118

0.1 g. of the methosulfate salt of the dye cation is dissolved in 5 ml. of a 5% solution of acetic acid. The dye-acid solution is then added to 300 ml. of water containing 150 mg. of a wetting agent (Igepon T), 1 g. of sodium sulfate, and 1½ ml. of Latyl Carrier A (a dimethyl terephthalate-benzanilide emulsion sold by E. I. du Pont de Nemours and Co.) Ten g. of a fabric of "Dacron 64" fibers are placed in the dyebath and the bath is slowly brought to the boil. The dyeing is continued at the boil for 1 hour and then the fabric is removed, rinsed with water, scoured in a solution of 0.5 g./l. of Igepon T for 20 minutes at 80° C., rinsed with water, and dried at 250° F. in an oven.

The invention has been described in detail with particular reference to preferred embodiments thereof, but it will be understood that variations and modifications can be effected within the spirit and scope of the invention as described hereinabove.

We claim:

1. A monoazo compound having the formula

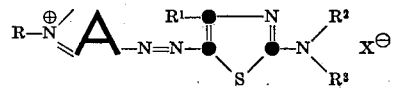

wherein

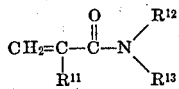

is an azole group having the formula

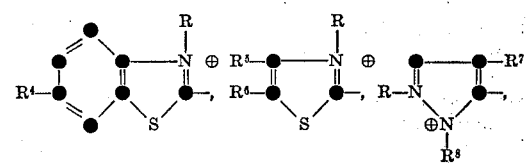

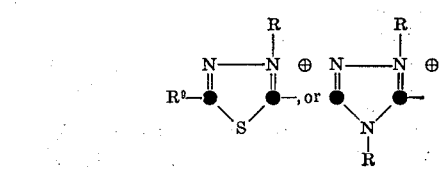

wherein
R represents lower alkyl or benzyl;
R⁴ represents hydrogen, lower alkyl, lower alkoxy, bromine or chlorine;
R⁵ represents hydrogen, lower alkyl, phenyl, or phenyl substituted with lower alkyl;
R⁶ represents hydrogen, thiocyanato, lower alkyl, chlorine, bromine or lower alkylsulfonyl;
R⁷ represents hydrogen, lower alkyl, cyano, lower alkoxycarbonyl, carbamoyl, phenyl, or phenyl substituted with lower alkyl;
R⁸ represents lower alkyl, phenyl, lower alkylphenyl, lower alkylsulfonyl, phenylsulfonyl, or lower alkyl-phenyl-sulfonyl;
R⁹ represents hydrogen, lower alkylthio, phenyl, or phenyl substituted with lower alkyl;
R¹ represents hydrogen, lower alkyl, phenyl or phenyl substituted with lower alkyl, lower alkoxy, chlorine, bromine, nitro, cyano, lower dialkylamino, hydroxy, or lower alkanoyloxy;
R² and R³, when each is taken singly, are the same or different and each represent hydrogen, lower alkyl, lower hydroxyalkyl, cyclohexyl, phenyl or phenyl substituted with lower alkyl, lower alkoxy, chlorine or bromine;

when taken collectively, represents piperidino, lower alkylpiperidino, morpholino, lower alkylmorpholino, pyrrolidino, N-thiomorpholine-1,1-dioxide; and
X is an anion.

2. A monoazo compound having the formula:

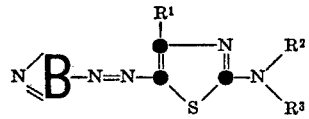

wherein

represents an azole group having the formula

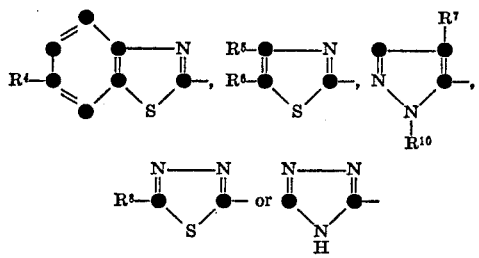

wherein
R⁴ represents hydrogen, lower alkyl, lower alkoxy, chlorine or bromine;
R⁵ represents hydrogen, lower alkyl, phenyl or phenyl substituted with lower alkyl;
R⁶ represents hydrogen, thiocyanato, lower alkyl, chlorine, bromine or lower alkylsulfonyl;
R⁷ represents hydrogen, lower alkyl, cyano, lower alkoxycarbonyl, carbamoyl, phenyl or phenyl substituted with lower alkyl;
R¹⁰ represents hydrogen, lower alkyl, phenyl or phenyl substituted with lower alkyl; and
R⁸ represents hydrogen, lower alkylthio, phenyl or phenyl substituted with lower alkyl;
R¹ represents hydrogen, lower alkyl, phenyl or phenyl substituted with lower alkyl, lower alkoxy, chlorine, bromine, nitro, cyano, lower dialkylamino, hydroxy, or lower alkanoyloxy;
R² and R³, when each is taken singly, are the same or different and each represents hydrogen, lower alkyl, lower hydroxyalkyl, cyclohexyl, phenyl or phenyl substituted with lower alkyl, lower alkoxy, chlorine or bromine; and

when taken collectively, represents piperidino, lower alkylpiperidino, morpholino, lower alkylmorpholino, pyrrolidino, N-thiomorpholine-1,1-dioxide.

3. A monoazo compound according to claim 1 having the formula

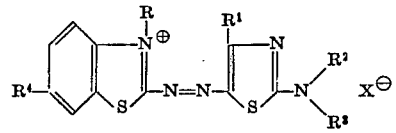

wherein
R⁴ represents hydrogen, lower alkyl, lower alkoxy, bromine, or chlorine;
R represents methyl or ethyl;
R¹ represents phenyl or phenyl substituted with lower alkyl, lower alkoxy, or hydroxy;
R² represents hydrogen, lower alkyl, phenyl, or phenyl substituted with lower alky; and
R³ represents hydrogen or lower alkyl.

4. A monoazo compound according to claim 1 having the formula

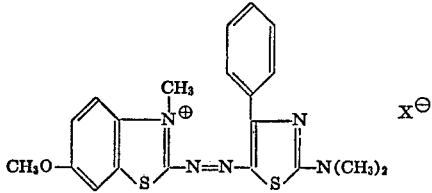

5. A monoazo compound according to claim 1 having the formula

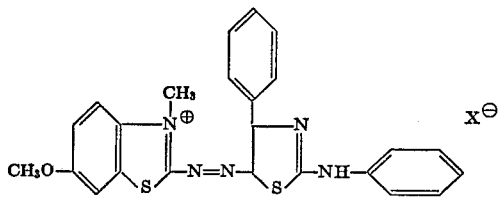

6. A monoazo compound according to claim 1 having the formula

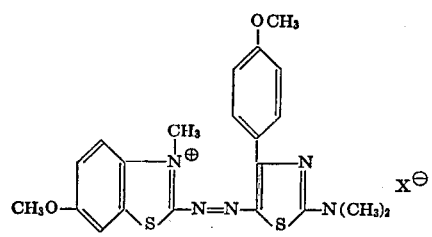

7. A monoazo compound according to claim 1 having the formula

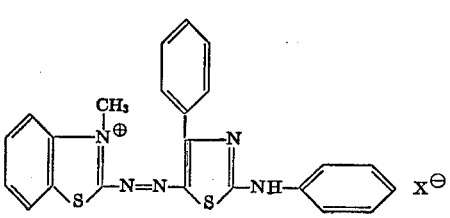

8. A monoazo compound according to claim 1 having the formula

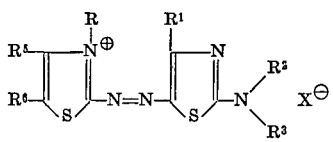

wherein
R⁵ represents hydrogen, lower alkyl, phenyl, or phenyl substituted with lower alkyl;
R⁶ represents hydrogen, thiocyanato, lower alkyl, chlorine, bromine, or lower alkylsulfonyl;
R represents methyl or ethyl;
R¹ represents phenyl or phenyl substituted with lower alkyl, lower alkoxy, or hydroxy;
R² represents hydrogen, lower allkyl, phenyl or phenyl substituted with lower alkyl; and
R³ represents hydrogen or lower alkyl, 9. A monoazo compound according to claim 1 having the formula

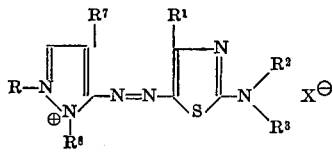

wherein
R represents methyl or ethyl;
R⁸ represents lower alkyl, phenyl, or phenyl substituted with lower alkyl, phenylsulfonyl, lower alkylsulfonyl;
R⁷ represents hydrogen, lower alkyl, cyano, lower alkoxycarbonyl, carbamoyl, phenyl, or phenyl substituted with lower alkyl;
R¹ represents phenyl or phenyl substituted with lower alkyl, lower alkoxy, or hydroxy;
R² represents hydrogen, lower alkyl, phenyl or phenyl substituted with lower alkyl; and
R³ represents hydrogen or lower alkyl.

10. A monoazo compound according to claim 1 having the formula

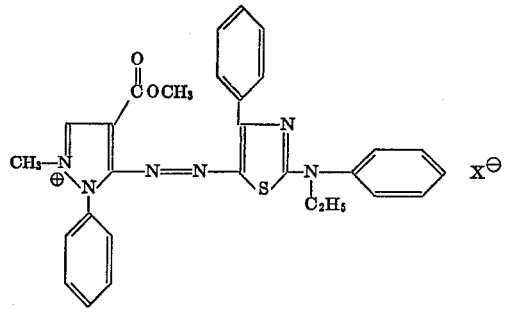

11. A monoazo compound according to claim 1 having the formula

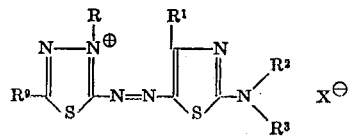

wherein
R⁹ represents hydrogen, lower alkylthio, phenyl, or phenyl substituted with lower alkyl;
R represents methyl or ethyl;
R¹ represents phenyl or phenyl substituted with lower alkyl, lower alkoxy, or hydroxy;
R² represents hydrogen, lower alkyl, phenyl, or phenyl substituted with lower alkyl; and
R³ represents hydrogen or lower alkyl.

12. A monoazo compound according to claim 1 having the formula

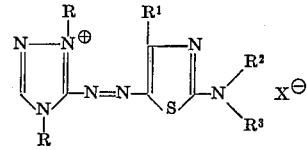

wherein
R represents methyl or ethyl;
R¹ represents phenyl or phenyl substituted with lower alkyl, lower alkoxy, or hydroxy;
R² represents hydrogen, lower alkyl, phenyl, or phenyl substituted with lower alkyl; and
R³ represents hydrogen or lower alkyl.

13. A monoazo compound according to claim 1 having the formula

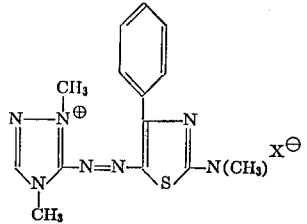

14. A monoazo compound according to claim 1 having the formula

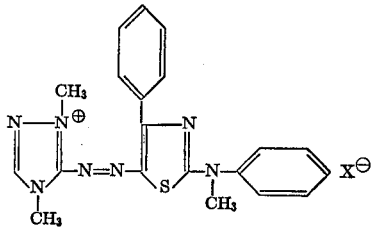

References Cited
UNITED STATES PATENTS
2,893,816   7/1959   Tsang et al. _____ 260—158 X FLOYD D. HIGEL, Primary Examiner U.S. Cl. X.R.

8—41 C; 260—155, 156, 247.5, 305, 306.8 R, 306.8 D, 308 R, 309.2, 310 R

UNITED STATES PATENT OFFICE
CERTIFICATE OF CORRECTION

Patent No. 3,770,719   Dated November 6, 1973

Inventor(s) John G. Fisher and Clarence A. Coates, Jr.

It is certified that error appears in the above-identified patent and that said Letters Patent are hereby corrected as shown below:

Column 2, delete lines 71 and 72 in their entirety and insert therefor ---present on the substituted alkyl radicals which $R^2$ and $R^3$ can represent. Illustrative of such substituents are lower---.

Column 3, line 10, delete "oly, oxyethyl" and insert therefor ---oyloxyethyl---.

Column 3, line 13, delete "glutarimidopropyl" and insert therefor ---3-glutarimidopropyl---.

Column 5, line 57, delete "3-aminodiazole" and insert therefor ---3-aminoindazole---.

Column 6, lines 3-13, delete the formula therein and insert therefor ---

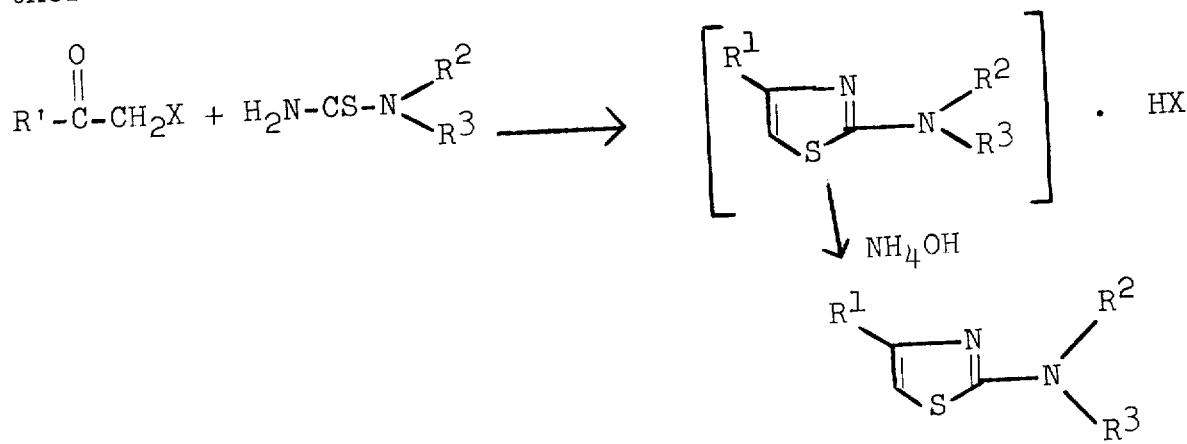

UNITED STATES PATENT OFFICE
CERTIFICATE OF CORRECTION

Patent No. 3,770,719  Dated November 6, 1973

Inventor(s) John G. Fisher and Clarence A. Coates, Jr.

It is certified that error appears in the above-identified patent and that said Letters Patent are hereby corrected as shown below:

- 2 -

Column 8, lines 7-20, delete the formula therein and insert therefor ---

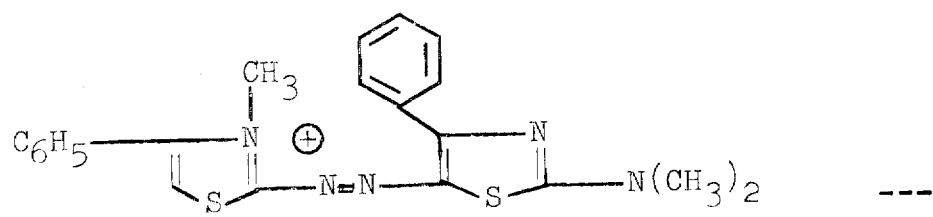

---

Columns 9 and 10, Table I, Example 21, centered under the headings "$R^2$" and "$R^3$", delete "-$NR^2R^3$-morpholino" and insert therefor --- -$NR^2R^3$=morpholino ---.

Columns 9 and 10, Table I, Example 22, centered under the headings "$R^2$" and "$R^3$", delete "-$NR^2R^3$-piperidino" and insert therefor --- -$NR^2R^3$=piperidino ---.

Column 14, Table IV, under the heading "$R^2$", Example 85, delete "$C_5H_6$-" and insert therefor ---$C_6H_5$- ---.

Column 14, Table IV, Example 95, centered under the headings "$R^2$" and "$R^3$", delete "-$NR^2R^3$-piperidino" and insert therefor --- -$NR^2R^3$=piperidino ---.

Column 14, Table IV, Example 96, centered under the headings "$R^2$" and "$R^3$", delete "-$NR^2R^3$-morpholino" and insert therefor --- -$NR^2R^3$=morpholino ---.

Column 14, Table IV, Example 97, centered under the headings "$R^2$" and "$R^3$", delete "-$NR^2R^3$-morpholino" and insert therefor --- -$NR^2R^3$=morpholino ---.

UNITED STATES PATENT OFFICE
CERTIFICATE OF CORRECTION

Patent No. 3,770,719     Dated November 6, 1973

Inventor(s) John G. Fisher and Clarence A. Coates, Jr.

It is certified that error appears in the above-identified patent and that said Letters Patent are hereby corrected as shown below:

Column 14, Table IV, Example 87, under the heading "R³", delete "C H₅-" and insert therefor ---$C_2H_5$- ---.

Column 19, lines 26-29, the formula should read ---

---

Column 20, line 27, delete "alky" and insert therefor ---alkyl---.

Column 22, Claim 13, delete the formula therein and insert therefor---

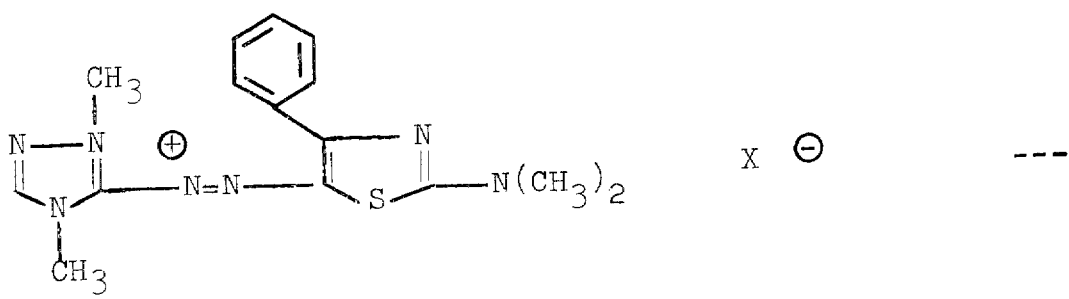

---

Signed and sealed this 9th day of April 1974.

(SEAL)
Attest:

EDWARD M. FLETCHER, JR.
Attesting Officer

C. MARSHALL DANN
Commissioner of Patents